A. WEED.
File Cutting Machine.
No. 53,204.
Patented March 13, 1866.
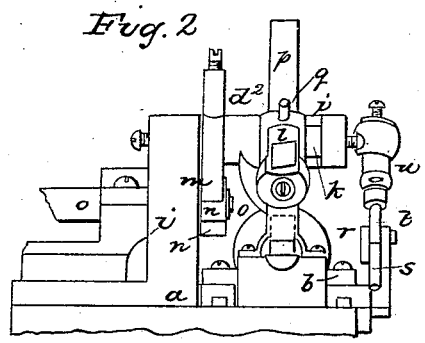
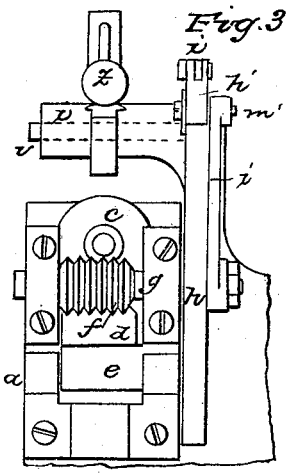
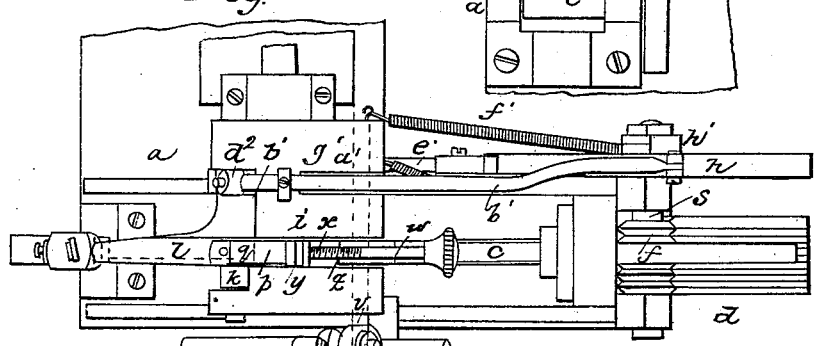
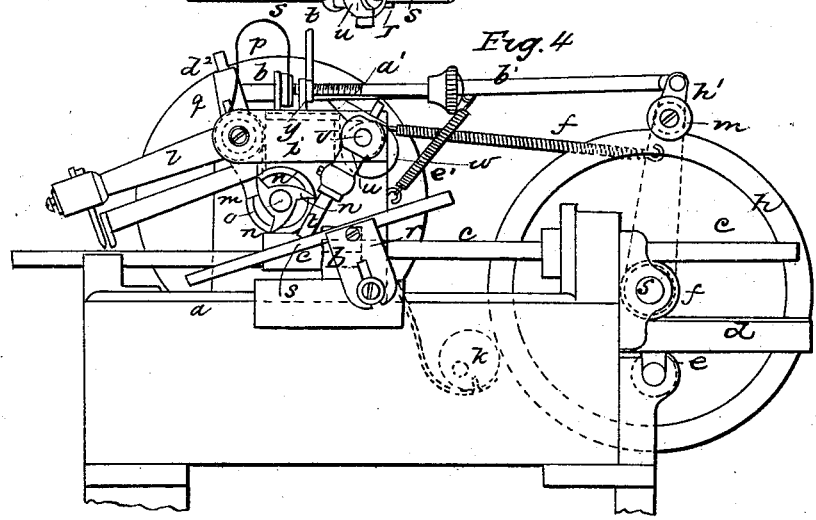

UNITED STATES PATENT OFFICE.

ALFRED WEED, OF BOSTON, MASSACHUSETTS.

IMPROVEMENT IN MACHINES FOR CUTTING FILES.

Specification forming part of Letters Patent No. 53,204, dated March 13, 1866.

*To all whom it may concern:*

Be it known that I, ALFRED WEED, of Boston, in the county of Suffolk and State of Massachusetts, have invented an Improved Machine for Cutting Files; and I do hereby declare that the following, taken in connection with the drawings, which accompany and form part of this specification, is a description of my invention sufficient to enable those skilled in the art to practice it.

The invention relates to the manufacture of machine-cut files.

In cutting from the narrow to the wide parts of the face of a file-blank, or vice versa, it is not only necessary to vary the force of the blow of the cutter according to the width of the blank, as is well understood, but it is desirable to variably space the teeth, so that they shall be farthest apart where the file is widest, and shall regularly vary in distance apart according to the width of the blank; and this invention consists in modifying the force of the cutting-blow and the extent of the feed-motion of the blank relatively to each other by means of cams placed on the same shaft when this is actuated by one and the same device to operate the cams, and thereby the mechanism controlling the blow and the feed; also, in the manner of effecting the feed of the blank.

A machine embodying the invention is represented in the drawings, Figure 1 showing a plan, Figs. 2 and 3 end elevations, and Fig. 4 a side elevation, of the mechanism.

$a$ denotes the frame or bed; $b$, a carriage sliding upon suitable ways on such bed, and carrying the movable bearing which supports the front end of the shaft or blank-holder $c$, the opposite end of such shaft sliding through a stationary bearing on the frame $a$.

The carriage $b$ is fastened to or forms part of another carriage, $d$, the rear end of which is supported on a roller, $e$.

A feed-roller, $f$, impinges against the upper surface of this carriage, said roller being mounted on a shaft, $g$, one end of which bears a wheel, $h$, through which an intermittent feed-movement is imparted to the carriage and the file-blank fixed thereto, as will be hereinafter explained.

Erected upon the frame $a$ is another frame, $i$, in the front end of which is journaled the shaft $k$, which carries the cutter lever or arm $l$. The blank-holder turns freely in its bearings, and the leveler, by which the face of the blank is kept parallel to the edge of the cutter, is fixed to an arm hung loosely upon the shaft $k$, the under surface of the file-bed which supports the file-blank being supported under the cutter in a semicircular or curved bed, in which it can freely turn.

The shaft $k$ has an arm, $m$, fixed to and projecting below it, which arm is operated upon by wipers or cams $n$ on the driving-shaft $o$, the striking of each wiper turning the shaft $k$ and lifting the arm $l$ and its cutter, and the cutter being thrown down as each wiper passes the arm $m$ by the action of a spring, $p$, upon a pin, $q$, projecting from the cutter-arm $l$, as will be readily understood.

The carriage $b$ carries a pattern-holder, $r$, in the top of which is secured a pattern or incline, $s$. Upon this incline the lower end of a rod, $t$, impinges, this rod projecting from an arm, $u$, fixed upon a shaft, $v$, turning in bearings in the frame $i$. This shaft has an eccentric or cam, $w$, fixed to it, against the face of which a slide, $x$, is held by the spring $p$. This slide has a projection, $y$, through which an adjusting-screw, $z$, works, and the spring $p$ is supported upon the front end of this screw, the force of the blow of the cutter, dependent upon the spring, being adjusted by the screw, and the screw working through the projection from the slide $x$, which is held to the surface of the cam $w$ by the force of the spring. The shaft $v$ carries another cam or lifter, $a'$, to the upper end of which a long pawl-rod, $b'$, is held by a spring, $e'$. The front end of this pawl-rod slides between guide-pins, and is held in normal position with respect to an arm, $d^2$, projecting from the shaft $k$, by a spring, $f'$, the extent of its movement toward the projection being determined, if necessary, by an adjustable stop, $g'$, abutting against the guide-pins, or in any other suitable manner. The other end of this pawl-rod is jointed to a friction-pawl, $h'$, on the top of an arm, $i'$, which is mounted loosely on the shaft $g$, which carries the feed-wheel $h$. The arm $i'$ is drawn toward the frame $i$ by the spring $f'$. The pawl $h'$ is hung on a pin, $m'$, eccentrically to the arm $i'$, so that in its normal position its lower surface does not impinge upon the perimeter of the feed-wheel, while, if the pawl-rod be pushed outward, the pawl $h'$ turns on the pin $m'$, by which it is jointed to the arm $i'$, and impinges upon, and imparts rotation to, the wheel $h$, the pawl slipping back over the surface of such wheel without communicating motion to it. To prevent any retrograde movement of the wheel, however, an eccentric brake-roller, $k'$, is hung to the frame $a$ in such manner as to be thrown tightly against the surface of the wheel by any tendency of said wheel to turn back.

The operation of the mechanism is as follows: The file-blank being laid upon the file-bed with its tang secured in the end of the shaft $c$, and the carriage being drawn back to bring the point of the file under the cutter, the parts are then in about the position shown in Fig. 4. Motion being then given to the driving-shaft, the blows of the cutter are effected by the wipers or cams $n$ and the spring $p$, and the pawl-rod $b'$ is driven back after each blow of the cutter by the arm $d^2$, thus actuating the friction-pawl $h'$, turning the feed-wheel $h$ and carrying the carriage and its blank forward the space of a tooth.

As the carriage and blank move forward the incline or pattern $s$ lifts the rod $t$, which turns the shaft $v$, causing the cam $w$ to force in the slide $x$, which carries the cutter-spring $p$. This movement of the slide increases the tension of the spring $p$, causing the cutter to be driven with increasing force against the face of the blank as the blank is fed from the point toward the tang. The movement of the shaft $v$ at the same time causes the cam or lifter $a'$ to gradually raise the pawl-rod $b'$, so that the arm $d^2$ drives the pawl-rod a gradually-increasing distance at each successive blow of the cutter, and thus communicates an increasing feed-movement to the blank. It will thus be observed that the increase of space between successive teeth from the point to the tang and the increase of the force of the successive blows of the cutter are simultaneously and automatically produced, and that these changes may be produced, according to the nature or shape of the face of the blank, by the form or degree of inclination given to the pattern $s$.

It will be obvious that the variable spacing of the teeth is produced with greater certainty and accuracy by the employment of the friction-pawl than could be effected by a ratchet mechanism.

I claim—

1. The combined arrangement of parts, operating together substantially as described, for varying relatively to each other, at the same time and from the same indicator, the force of the cutting-blow and the extent of the feed-movement.

2. The employment of the friction-pawl $h'$, acting upon the surface of the feed-wheel $h$, substantially as set forth.

3. In combination with the feed-wheel $h$, the brake-wheel $k'$, operating as a detaining-pawl, substantially as set forth.

In witness whereof I have hereunto set my hand this 18th day of November A. D. 1865.

ALFRED WEED.

Witnesses:
F. GOULD,
J. B. CROSBY.